United States Patent [19]
Eneberg et al.

[11] Patent Number: 6,090,240
[45] Date of Patent: Jul. 18, 2000

[54] METHOD OF INHIBITING SCALING IN BLACK LIQUOR EVAPORATORS

[75] Inventors: Henrik Eneberg, Helsinki, Finland; Jarmo Kaila, Alpharetta, Ga.; Erkki Kiiskila, Karhula, Finland

[73] Assignee: Ahlstrom Machinery Oy, Espoo, Finland

[21] Appl. No.: 09/026,562

[22] Filed: Feb. 20, 1998

Related U.S. Application Data

[60] Provisional application No. 60/038,646, Feb. 21, 1997.

[51] Int. Cl.[7] .................................. B01D 1/26; B01D 3/34; D21C 11/10; C02F 1/04
[52] U.S. Cl. ......................... 159/47.3; 159/16.3; 159/29; 159/DIG. 8; 159/DIG. 20; 159/901; 162/29; 162/48; 203/6; 203/7; 210/698
[58] Field of Search ..................................... 159/47.3, 2.3, 159/2.1, 16.3, 901, 29, DIG. 3, DIG. 20; 162/29, 48; 203/6, 7, 71, 95; 202/174; 210/702, 698

[56] References Cited

U.S. PATENT DOCUMENTS

| | | | |
|---|---|---|---|
| 4,249,990 | 2/1981 | Gilbert et al. | 162/17 |
| 4,755,258 | 7/1988 | Ryham | 159/47.3 |
| 4,953,607 | 9/1990 | Erkki et al. | 159/27.3 |
| 5,407,583 | 4/1995 | Gill et al. | 159/47.3 |
| 5,409,571 | 4/1995 | Togo et al. | 210/698 |
| 5,562,830 | 10/1996 | Zidovec et al. | 162/38 |
| 5,716,496 | 2/1998 | Agren | 159/49 |

OTHER PUBLICATIONS

Frederick et al, "Preventing Calcium Carbonate Scaling in Black Liquor Evaporators", Part One of Two, Southern Pulp and Paper Manufacturer/Aug., 1979, pp. 22–24.

Frederick, et al, "Preventing Calcium Carbonate Scaling in Black Liquor Evaporators", Part Two of Two, Southern Pulp and Paper Manufacturer/Sep., 1979, pp. 21–29.

*Primary Examiner*—Virginia Manoharan
*Attorney, Agent, or Firm*—Nixon & Vanderhye P.C.

[57] ABSTRACT

A method of inhibiting calcium carbonate scaling in a multi-stage evaporation plant of black liquor by heat-treating calcium-containing liquor includes a first stage wherein the calcium-containing liquor is heated to about 110–145° C. with direct contact with the heating medium; a second stage wherein the liquor is maintained at this temperature in a retention tank for 1–20 minutes to reduce the amount of calcium in the liquor by precipitating calcium carbonate; and a third stage wherein the heat-treated liquor is evaporated for combustion.

22 Claims, 2 Drawing Sheets

METHOD OF INHIBITING SCALING IN BLACK LIQUOR EVAPORATORS

This invention is based on Provisional Application Ser. No. 60/038,646, filed Feb. 21, 1997, the contents of which are hereby incorporated by reference.

BACKGROUND OF THE INVENTION

The present invention relates to a method of inhibiting fouling of heat transfer surfaces in a multi-stage evaporation plant of alkaline waste liquor in chemical pulp industry by heat-treating calcium-containing liquor to be fed to the evaporation plant.

Alkaline cooks, in particular the sulphate process, have conventionally been performed in such a way that the wood, i.e., chips, and the cooking liquor are mixed into a cooking vessel, the temperature of which is then raised to the cooking temperature, typically to 160–180° C., for a given time, whereby lignin is detached from the wood, the result being so called chemical pulp and waste liquor. In a sulphate process, the cooking liquor is white liquor, which is a mixture of NaOH and Na2S. The waste liquor is black liquor containing dissolved lignin, salts of organic acids, extractives and a significant amount of inorganic compounds.

As a rule, the inorganic components are recovered from the black liquor, whereas the organic part is used as combustible matter. For recovery, the black liquor is evaporated to a higher dry matter content (70–90%) in a multi-stage evaporation plant. An evaporation plant operates most commonly in such a way that the vapor produced in the evaporator having the highest pressure is used to heat the evaporator having the next highest pressure. Typically, an evaporation plant comprises 5–7 stages.

A common problem in black liquor evaporation plants is the fouling of heat transfer surfaces, which decreases the efficiency of the heat transfer process. Such fouling is fairly typical on the side of the material to be treated, i.e., black liquor, and more rapid in connection with higher dry matter contents. In order to make the evaporation plant operate satisfactorily, the fouled surfaces need to be cleaned from time to time.

The worst problems with fouling in black liquor evaporation plants are connected with calcium carbonate scaling. Scales caused by calcium mainly consist of crystal calcium carbonate scales or binary salt scales of calcium carbonate and sodium carbonate. Calcium carbonate is a very poorly soluble compound and the dispersed particles in the liquor thereof do not cause fouling.

It has been observed that calcium carbonate scaling is more dependent on the temperature than on the dry matter content of the liquor. Frederick and Grace (Southern Pulp and Paper Manufacturer 42(1979)8:22) have suggested that the amount of dissolved calcium in black liquor is increased because calcium forms a complex together with the lignin in the black liquor. The lignin fragments formed during the cook and containing adjacent hydroxyl groups especially in an aromatic cyclic structure react with calcium. This complex is unstable at high temperatures, whereby it decomposes and releases the calcium ion to the vicinity of the hot surface, whereby the calcium ion rapidly associates with the carbonate ion in the liquor, forming a scale on the surface.

Frederick and Grace have further suggested that the calcium scaling could be reduced or inhibited by means of a treatment in which the black liquor is heated to about 150–160° C. and maintained at this temperature for 10–20 minutes.

The above-described method, in which the black liquor is heated to the temperature of about 150° C., has not been widely used, since the additional energy required for it may cause remarkable costs.

SUMMARY OF THE INVENTION

An object of the invention is to provide a more applicable, cost-effective and efficient way to inhibit calcium carbonate scales on the heat transfer surfaces of the black liquor evaporator.

In accordance with the present invention, a) the calcium-containing liquor is heated to about 110–145° C. by means of direct contact with a heating medium; b) the liquor is maintained at said temperature in a retention tank for 1–20 minutes to reduce the amount of calcium in the liquor by precipitating calcium carbonate; and c) the heat-treated liquor is evaporated for combustion.

For example, the present invention provides a solution to the problem recently observed at evaporation plants of many chemical pulp mills. At the front end of an evaporator (in the flowing direction of the steam), increased fouling of heat transfer surfaces has been observed. This is probably connected with changed cooking methods.

Modifications of the sulphate process have been developed, well-known methods including a so called SUPERBATCH process and an RDH process. By means of these processes the heat economy is improved and a low cooking Kappa number is reached by reusing black liquor generated in the cook. In a continuous cook, it is also possible to circulate black liquor to the pretreatment of chips during the impregnation stage, as has been described in WO patent application 96/07787, for example. The black liquor circulated to the beginning of the cook in a sulphate process adds sulphur compounds to the cellulose material, which compounds, lowering the Kappa number of the pulp, have a very preferable effect in the impregnation stage. Also other sulphur-containing liquors, such as green and white liquor, arc used in the pre-treatment of chips.

In the pre-treatment, the temperature is typically about 80–140° C. These temperatures are significantly lower than in the actual cook (e.g., 170° C.). In the pre-treatment, calcium is detached from the wood to the treatment liquor, whereby some soluble calcium remains in the liquor when the liquor is removed from the pre-treatment. This liquor is combined with the black liquor coming from the cook, and the mixture of the two is led to the evaporation plant, where the soluble calcium in suitable conditions precipitates on the heat transfer surfaces. If the chip material is treated in the cook having a temperature of above 150° C., the calcium precipitates as carbonate on the fibers already in the digester, whereby the calcium scaling is inhibited in a black liquor evaporation plant. The increased fouling of evaporation plants observed recently results from the very addition of green liquor for example at a temperature of 85° C. in the pre-impregnation to the black liquor flow to be evaporated. At this temperature, the calcium detached from the chips is soluble or dispersed.

The present invention is based upon the surprising discovery that the detrimental scales on the heat transfer surfaces may be inhibited by a quick heat treatment at a low temperature. It is believed that in the pre-treatment the calcium ions, together with the organic substances which have been detached from the wood, form salts or complexes, e.g., calcium-soap complexes, which decompose at a significantly lower temperature than the above-described calcium-lignin complexes. The released calcium ion forms, together with the carbonate ions in the liquor, solid calcium carbonate, which stays in the liquor and does not precipitate, as heat-treated liquor is evaporated after this treatment. In accordance with the invention, the heat treatment may be effected to the liquor coming from the pre-treatment or to the mixture of the liquor from the pre-treatment and the black liquor obtained from the actual cook and to be introduced to the evaporation plant. Thus, the heat treatment in accordance with the invention at temperatures lower than those used in conventional methods is able to protect the evaporators against fouling. The basic principle of the heat treatment is to create scaling-promoting conditions as early as in the heat treatment vessel, whereby scaling does not take place in the corresponding evaporator vessel itself. No calcium carbonate needs to be added to the liquor to be heat-treated. The invention provides a method which is cost-effective with respect to heat economy, as secondary vapor generated in the evaporation plant may be used in the heat treatment for heating the liquor.

The heat treatment in accordance with the invention may be applied not only in connection with the evaporation of sulphate black liquor but also in the evaporation of waste liquor from a soda pulping process.

In addition to the pre-treatment liquor, there are also other calcium-containing liquors at a chemical pulp mill which can be treated in accordance with the present invention.

Nowadays, when there are attempts to close water circulations of pulp mills, it has been observed that one solution is to evaporate bleach plant effluents and to treat the pre-concentrated effluent together with black liquor. Acidic waste water contains a large amount of soluble calcium in particular. Therefore, combining bleaching effluents and filtrates with black liquor may add to the fouling of heat transfer surfaces of a black liquor evaporation plant. By treating a mixture of black liquor and bleaching effluent it is possible to substantially decrease fouling.

At a chemical pulp mill, it is possible to add also other calcium-containing liquors to the waste liquor to be evaporated in addition to bleaching waters. These may include for example waste acid from a chlorine dioxide plant, sulphite waste liquor or CTMP liquor. By heat-treating such a liquor or a mixture of such a liquor and alkaline waste liquor in accordance with the invention it is also possible to inhibit fouling.

The heat treatment is performed at a temperature of 110–145° C. The heat treatment time is 1–20 minutes, preferably 5–10 minutes.

Calcium scaling is also dependent upon the dry matter content of the black liquor. A suitable dry matter content in the heat treatment is dependent upon the properties of the liquor, for example, but is typically 35–45%. A typical point where the heat treatment takes place in a seven-stage counter-current evaporation plant is prior to the second or the third stage.

In the method according to the invention, a calcium-containing liquor, such as sulphate black liquor, is heated with direct contact with a hot heating medium, whereby there will be no risk of the fouling of a heat exchanger in the heat treatment. Hereby, it is possible to use heating steam or vapor which is most easily available at the mill. Suitable steam or vapor may be for example low-pressure fresh steam, or secondary vapor from the first evaporation stage in the direction of steam, whereby the use of fresh steam is avoided. Suitable secondary vapor is available at an evaporation plant in which the waste liquor is evaporated in the final stage to a high dry matter content (75–90%), medium pressure steam being used in the final evaporation.

In the heat treatment, the retention tank may be a separate vessel, a bottom part of an evaporator vessel, or a separate section arranged in an evaporation vessel and separated by a dividing wall. The contact between the liquor and the vapor may be arranged for example in a separate condensator ahead of the retention vessel or in the retention vessel. The most preferable apparatus arrangement depends, however, on the temperature and the pressure required for the heat treatment, as well as on the connections and conditions of the evaporation plant.

Instead of steam or vapor, the liquor to be heat-treated may as well be heated with a hotter liquor. When the liquor to be heat-treated is an alkaline waste liquor, the hotter liquor is preferably a liquor circulating in the evaporator, for example in a falling-film evaporator or a forced-circulation evaporator. Hereby, the bottom part of the evaporator vessel is used as a retention vessel. A portion separated by a dividing wall, such as a baffle, may be arranged in the bottom part to ensure a sufficient retention time. In order to prevent detrimental scaling in the liquor circulation, the possibility of non-heat-treated liquor getting to the circulation has to be minimized.

BRIEF DESCRIPTION OF THE DRAWINGS

In the following, the method according to the invention is described in more detail with reference to the appended figures, of which.

DETAILED DESCRIPTION OF PREFERRED EMBODIMENTS

Figure 1:
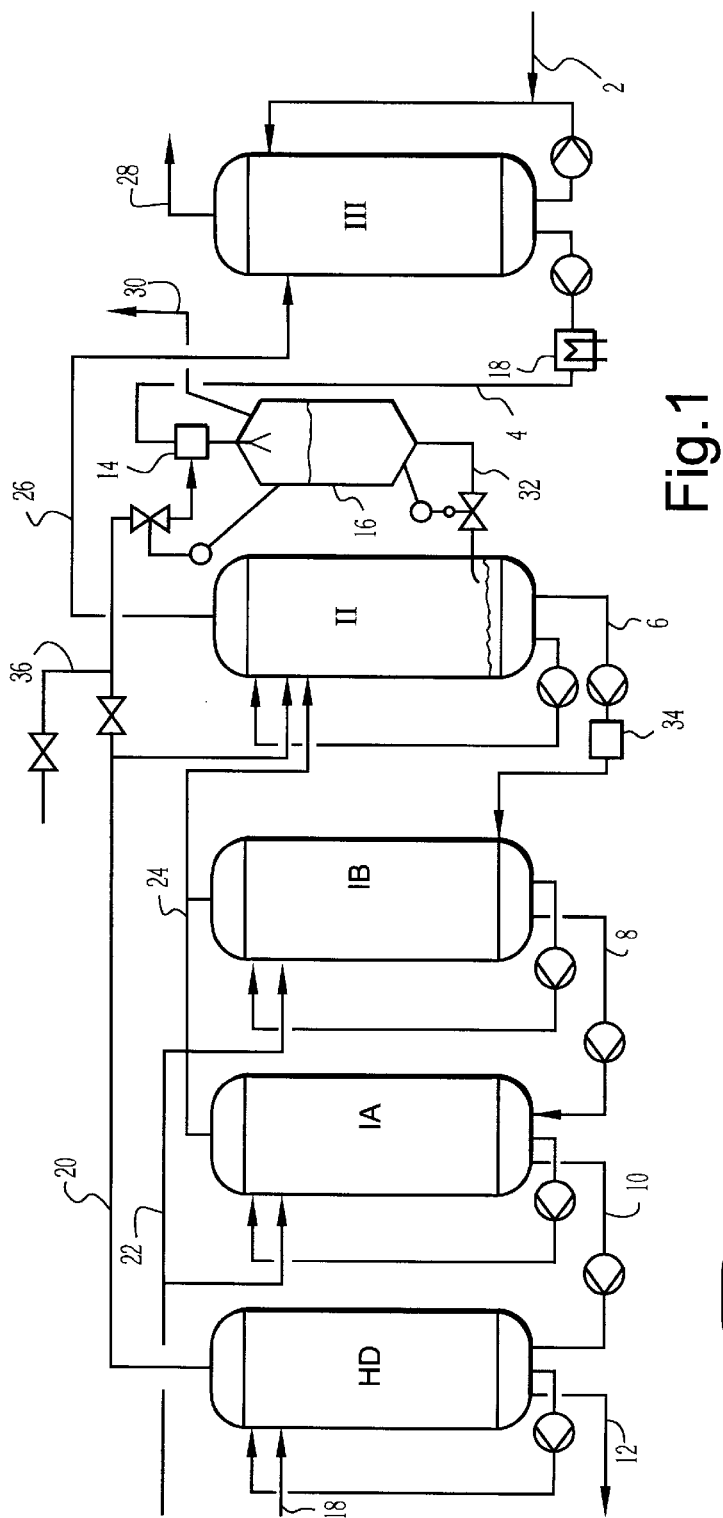
FIG. 1 schematically illustrates an exemplary apparatus for realizing the present invention.

FIG. 1 illustrates the front end of a multi-stage evaporation plant seen from the flow direction of the steam. In this case, the evaporation plant comprises sequential stages operating at successively decreasing pressures and temperatures, the first three stages I–III being illustrated. Stage I comprises steps IA, IB, and IC. The evaporators in FIG. 1 are falling-film evaporators, but in this case, other evaporators applicable to the evaporation of liquor may be used.

The liquor from stage IV (not shown) is brought through line 2 to stage III, in which the evaporated liquor is led through line 4 to stage II. Therefrom the liquor flows further in line 6 to the first stage, which comprises two steps IA, IB connected in series on the liquor side, and step IC. The liquor is first evaporated in step IB, from which it is introduced to step IA. Subsequently, the liquor is taken through line 10 to the final evaporation in step IC, in which the liquor is evaporated to a high dry matter content, i.e., 75–90%, and from which the strong liquor discharges through line 12 to combustion. The secondary vapor generated in step IC of stage I, which step is operated by means of the medium pressure steam from line 18, is directed through line 20 to stage II to be used as heating steam. The pressure of medium pressure steam is typically 9–17 bar(g) (900–1,700 kPa). Steps IA, IB of the first stage are connected in parallel on the steam side, low pressure fresh steam being used in them in line 22. The pressure of low pressure fresh steam is typically 2–4 bar(g), and thus the secondary vapor separated from the black liquor is led through line 24 to stage II. In a corresponding way, the rest of the stages utilize secondary vapor having been generated in the corresponding preceding stages. The secondary vapor of stage II is introduced via line 26 to be used as heating steam in stage III, the secondary vapor of stage III in line 28 being then used in a corresponding way.

A heat treatment system according to the invention is arranged between stages II and III, the main components of the system being a direct condenser 14 and a retention tank 16. The liquor evaporated in stage III is pre-heated in the heat exchanger 18, in which the temperature is lower than the decomposition temperature of a calcium complex to inhibit scaling in the apparatus. The liquor is pre-heated to about 90° C., for example. Through line 4, the liquor flows into the condenser 14, in which it is heated by means of the vapor coming from step IC through line 20 to the temperature required for the heat treatment, i.e., to 110–145° C.

To decompose the soluble calcium complexes and to form a calcium carbonate scale, the black liquor is maintained under pressure in the retention tank 16 for a sufficient time, for example about 5 minutes. After this, the black liquor is removed from the tank through line 32 to stage II having a lower pressure and temperature than the retention tank, whereby the liquor expands to this temperature and water discharges from the liquor in the form of steam. The expansion may as well take place in a separate flash tank arranged in line 32 before stage II.

A solid calcium carbonate scale has now been formed into the liquor, from which it may be removed, if desired, after stage II by means of a separator 34 in line 6, although this kind of separation is usually not necessary.

It is not only secondary vapor from step IC of stage I, but also low-pressure steam or vapor from line 36 or secondary vapor from steps IA, IB that may be used as heating steam. These steam sources are only exemplary, the most preferred steam flow for heating of black liquor being dependent upon the connections of each evaporator.

Figure 2:
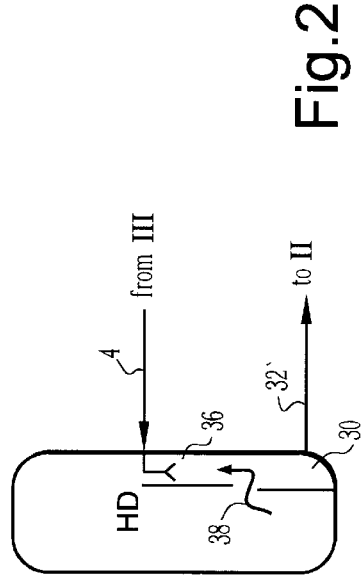
FIG. 2 schematically illustrates a detail of another exemplary apparatus for realizing the present invention.

FIG. 2 illustrates another alternative for performing the heat treatment. In this example, the treatment is carried out in step IC of stage I, whereby there will be no need for a separate tank 16. A space 36 is arranged inside the casing of the evaporator vessel, to the upper part of which space the liquor to be heat-treated is introduced from stage III through line 4. Steam or vapor, preferably secondary vapor 38 generated in step IC, is led towards the liquor. The lower part 40 of the space 36 functions as a retention tank, from which the liquor is led back in the evaporation line after a suitable retention time. The liquor is led to the evaporator stage II, in which it expands and is further evaporated. Since stage I operates at a higher pressure than evaporator stage II, there will be no need for pumping in connection with the back-leading of the liquor.

If it is possible to achieve a desired temperature, a corresponding arrangement may be realized also in connection with steps IA or IB of stage I, which operate by means of low pressure steam or vapor. The liquor fed to a separate reaction portion may be heated to the required reaction temperature also by a direct steam injection carried out in the feed line of the liquor. This arrangement is preferable when the time of the heat treatment is long and it is desirable to effect the heat treatment in the evaporator vessel.

Figure 3:
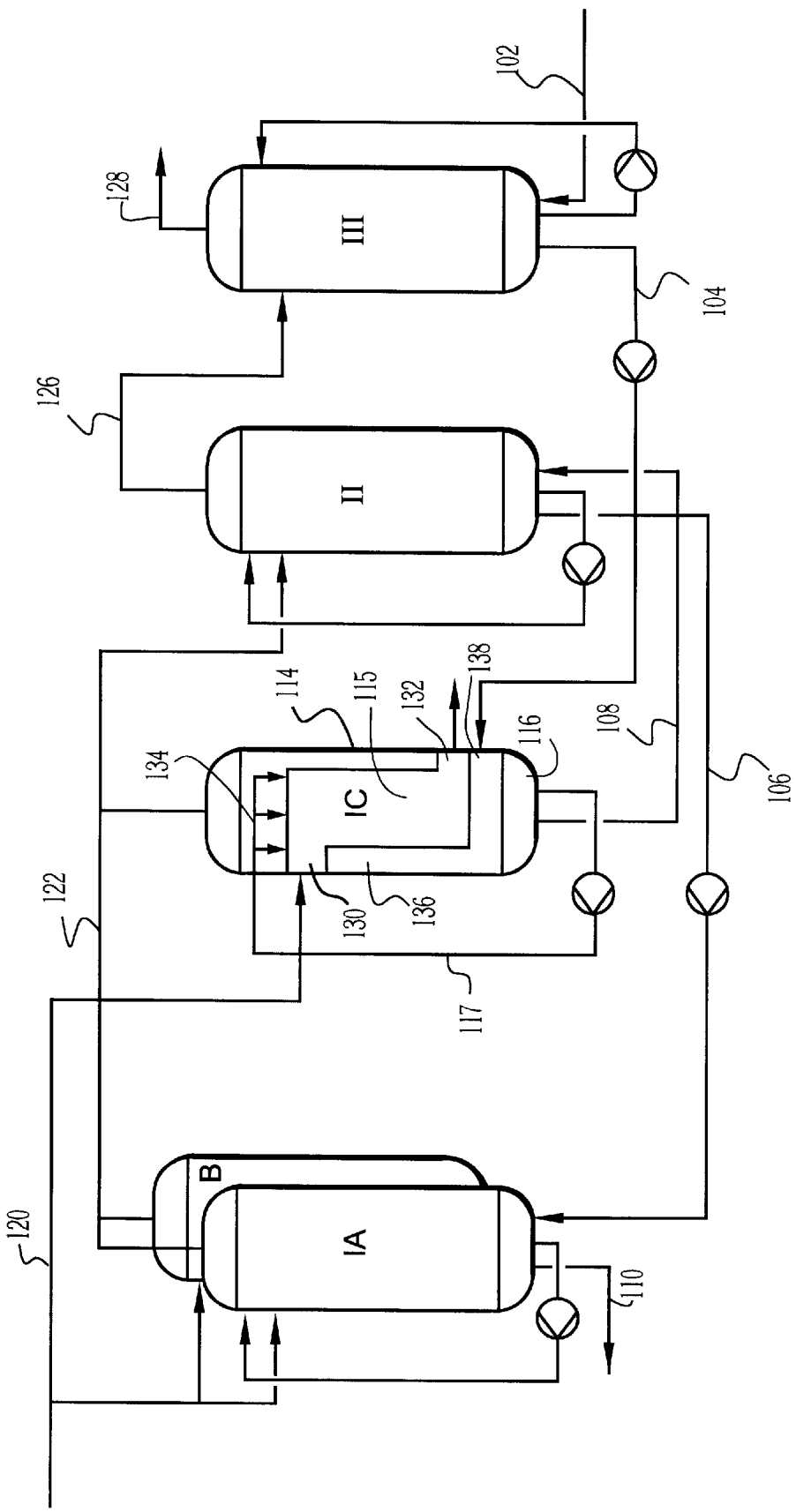
FIG. 3 schematically illustrates a third exemplary apparatus for realizing the present invention.

FIG. 3 illustrates an embodiment, in which the heating medium of the liquor heat treatment is, instead of steam or vapor, a liquor which is hotter than the liquor to be heat-treated.

Like in FIG. 1, the liquor is led from stage IV (not shown) along line 102 to stage III to be evaporated, whereby the heating steam is obtained from line 126.

Hereafter, the liquor is heat-treated by means of the method in accordance with the invention to decrease the amount of soluble calcium. An evaporation stage having an appropriate temperature is chosen for the heat treatment. The liquor is led from stage III along line 104 to step IC of stage I, in which the temperature is higher than in stage III, and to which fresh steam is introduced from line 120. Stage I comprises steps IA, IB and IC connected in parallel on tile steam side. The evaporator vessel IC comprises a number of vertical heat transfer elements 115, which may be formed by substantially parallel pairs of plates connected by their edges to form closed spaces inside the casing 114. The inside space of the heat transfer element, which forms the vapor condensation zone, is connected by their upper ends to a feed conduit 130 for the passing of the vapor and by their lower ends to the removal conduit 132 for the removal of vapor and condensate. A distributing device 134 is installed above the heat transfer elements to function as a member for distributing liquid substantially uniformly over the outer surfaces of the heat transfer elements. The space surrounding the heat transfer surfaces forms a boiling zone 136 of liquid in casing 114. An inlet conduit 138 is installed at the lower part of the casing for feeding liquid onto the bottom of the casing.

From the lower part 116 of the evaporator, the liquor is led through a conduit 117 to the distributing device 134. From there it flows down over the outer surfaces of the heat transfer elements 115 and is thereby heated with indirect contact with the steam inside the heat transfer elements, which steam has been introduced through line 120. The liquor is gathered onto the bottom 116 of the evaporator, from where it is circulated to the upper part of the heat transfer elements and to which also the liquor to be heat-treated is brought from line 104. The vapor having been evaporated from the liquor is removed through line 122 to stage II. The temperature of the liquor to be circulated is higher than that of the liquor in line 104 coming to the evaporator, whereby the temperature of the liquor mixture at the bottom of the evaporator will be 110–145° C., (e.g. 115–140° C.) which is the desired treatment temperature. The bottom part of the evaporator and the circulation velocity have to be defined in such a way that a sufficient retention time, i.e., 1–20 minutes, is achieved for the liquor to precipitate calcium prior to the removal of the liquor from the evaporator. This kind of arrangement is most applicable when the retention time is short.

Instead of a falling-film evaporator, a forced-circulation evaporator may be used to heat the liquor to be heat-treated with the liquor to be circulated in order to effect the heat-treatment. Instead of a plate element, a tubular heat transfer element may be used.

The heat-treated liquor is led through line 108 to be evaporated in stage II, and from there through line 106 to steps IA, IB, which are connected in series on the liquor side and in parallel on the steam side. Low pressure fresh steam is fed to stages IA and IB from line 120. The strong liquor is led to the combustion through line 110.

Although the invention is hereby shown and described in accordance with what is presently regarded as the most practical and the most preferable embodiment, it is clear to those skilled in the art that many modifications may be made within the scope of the invention, which scope is to be accorded the broadest possible interpretation of the appended claims, so that it encompasses all corresponding arrangements and processes.

What is claimed is:

1. A method of inhibiting fouling of heat transfer surfaces in a multi-stage evaporation plant of alkaline waste liquor which originates from a sulphate cook, the method comprising the steps of:

a) pre-treating comminuted cellulose-containing material by impregnating the material with a sulphur containing liquor in a pre-treatment stage, and removing the sulphur containing liquor, including calcium ion therein, from the pre-treatment stage;

b) heating the removed liquor from a) to a temperature of about 110–145 degrees C by direct contact with a heating medium;

c) maintaining the liquor from b) at a temperature of about 110–145 degrees C in a retention tank for a period of 1–20 minutes to reduce the amount of calcium in the liquor by precipitating calcium carbonate; and d) combining the liquor from c) with alkaline waste liquor to produce a combined liquor, and evaporating the combined liquor in a multi-stage evaporation plant.

2. A method as recited in claim 1 wherein b) is practiced at a temperature of 115–140 degrees C.

3. A method as recited in claim 1 wherein c) is practiced for a time period of 5–10 minutes.

4. A method as recited in claim 1 wherein b) is practiced by bringing steam or heating vapor into contact with the removed liquor.

5. A method as recited in claim 1 wherein b) is practiced by using a hotter liquid than the removed liquor.

6. A method as recited in claim 1 wherein d) is practiced using sulphate black liquor at a dry matter content of 35–45% as the alkaline waste liquor.

7. A method as recited in claim 1 further comprising the step of e) removing the heat treated liquor from the retention tank between c) and d), and expanding the heat treated liquor.

8. A method as recited in claim 7 wherein d) is practiced using sulphate black liquor as the alkaline waste liquor.

9. A method as recited in claim 8 wherein b) is practiced by bringing steam or heating vapor into contact with the removed liquor.

10. A method as recited in claim 7 wherein e) is practiced using an evaporator vessel having a liquor side, and by leading liquor from the retention tank to the liquor side of the evaporator vessel.

11. A method as recited in claim 1 wherein d) is practiced by using medium pressure steam, and includes a final evaporation stage including secondary vapor; and wherein c) is practiced by using the secondary vapor from the final evaporation stage.

12. A method as recited in claim 11 wherein b) is practiced in an evaporator vessel having a liquor circulation over heat transfer elements, and by using a circulated liquor from the liquor circulation that is brought into contact with the removed liquor.

13. A method of inhibiting fouling of heat transfer surfaces in a multi-stage evaporation plant of alkaline waste liquor used in chemical pulp industry by heat-treating a calcium-containing alkaline waste liquor, the method comprising the steps of:

(a) heating the calcium-containing liquor to a temperature of about 110–145° C. by direct contact with a heating medium;

(b) maintaining the liquor at the temperature in a retention tank for a period of 1–20 minutes to reduce the amount of calcium in the liquor by precipitating calcium carbonate;

(c) evaporating the heat-treated liquor for combustion; and (d) prior to step (a), adding other calcium-containing liquor, selected from the group consisting essentially of sulphite waste liquor, waste acid from a chlorine dioxide plant, effluent from a bleaching plant, and combinations thereof, to the calcium-containing liquor.

14. A method as recited in claim 13, wherein step (a) is performed at a temperature of 115–140° C.

15. A method of inhibiting fouling of heat transfer surfaces in a multi-stage evaporation plant of alkaline waste liquor used in chemical pulp industry by heat-treating a calcium-containing liquor comprising effluent from a bleach plant, the method comprising the steps of:

(a) heating the calcium-containing liquor to a temperature of about 110–145° C. by direct contact with a heating medium;

(b) maintaining the liquor at the temperature in a retention tank for a period of 1–20 minutes to reduce the amount of calcium in the liquor by precipitating calcium carbonate;

(c) adding the calcium-containing liquor into the alkaline waste liquor; and (d) evaporating the heat-treated liquor for combustion.

16. A method as recited in claim 15, wherein step (a) is performed at a temperature of 115–140° C.

17. A method of inhibiting fouling of heat transfer surfaces in a multi-stage evaporation plant of sulphate black liquor by heat-treating calcium-containing liquor to be fed to the evaporation plant, the method comprising the steps of:

(a) heating the calcium-containing liquor to a temperature of about 110–145° C. by direct contact with steam or a vapor heating medium;

(b) maintaining the liquor at the temperature in a retention tank for a period of 1–20 minutes to reduce the amount of calcium in the liquor by precipitating calcium carbonate;

(c) evaporating the heat-treated liquor for combustion; and (d) removing the heat-treated liquor from the retention tank between steps (b) and (c), expanding the heat-treated liquor, and evaporating the heat-treated liquor.

18. A method as recited in claim 17, wherein step (a) is performed at a temperature of 115–140° C.

19. A method of inhibiting fouling of heat transfer surfaces in a multi-stage evaporation plant of alkaline waste liquor used in chemical pulp industry by heat-treating calcium-containing liquor, the method comprising the steps of:

(a) heating the calcium-containing liquor to a temperature of about 110–145° C. by direct contact with a heating medium;

(b) maintaining the liquor at the temperature in a retention tank for a period of 1–20 minutes to reduce the amount of calcium in the liquor by precipitating calcium carbonate;

(c) evaporating the heat-treated liquor for combustion; and (d) effecting final evaporation of the alkaline liquor in a multi-stage evaporation plant using medium pressure steam, and wherein step (b) is practiced by using secondary vapor from the final evaporation.

20. A method as recited in claim 19, wherein step (a) is performed at a temperature of 115–140° C.

21. A method of inhibiting fouling of heat transfer surfaces in a multi-stage evaporation plant of alkaline waste liquor used in chemical pulp industry by heat-treating calcium-containing liquor to be fed to the evaporation plant, the method comprising the steps of:

(a) heating the calcium-containing liquor to a temperature of about 110–145° C. by direct contact with a heating medium comprising a liquor which is hotter than the liquor to be heat-treated;

(b) maintaining the liquor at the temperature in a retention tank for a period of 1–20 minutes to reduce the amount of calcium in the liquor by precipitating calcium carbonate;

(c) evaporating the heat-treated liquor for combustion; and (d) wherein step (a) is practiced in an evaporator vessel comprising a liquor circulation over the heat transfer elements; and wherein step (a) is further practiced by heating with a circulated liquor as the heating medium.

22. A method as recited in claim 21, wherein step (a) is performed at a temperature of 115–140° C.

* * * * *